June 5, 1928.
H. HOLZWARTH
GAS TURBINE
Filed Aug. 23, 1921
1,672,529
2 Sheets-Sheet 2
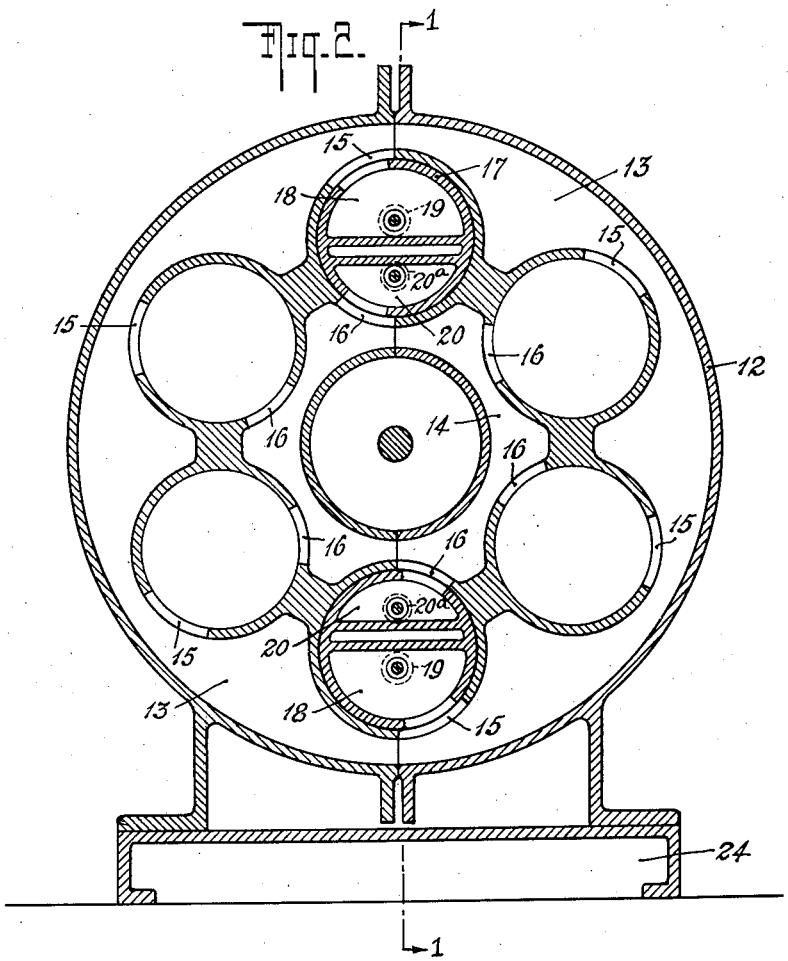
WITNESS
INVENTOR
HANS HOLZWARTH
BY
ATTORNEYS Patented June 5, 1928.

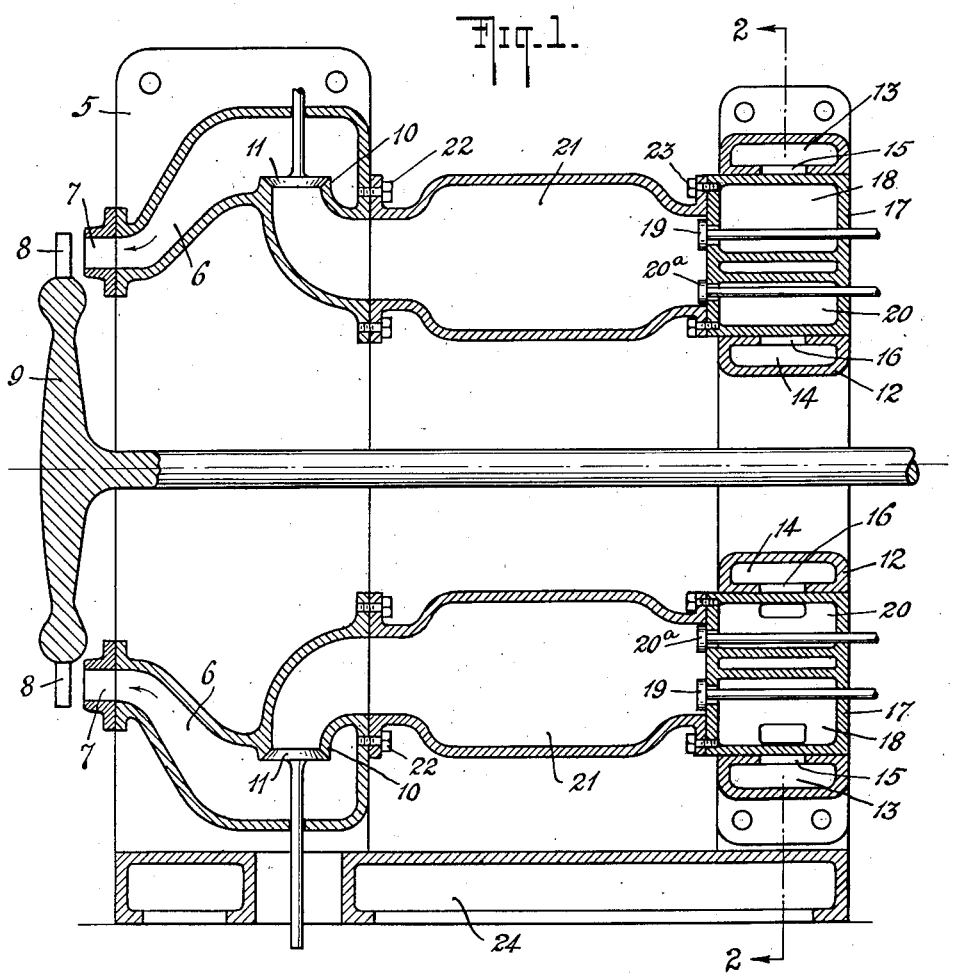

1,672,529

UNITED STATES PATENT OFFICE.

HANS HOLZWARTH, OF MULHEIM, GERMANY, ASSIGNOR TO HOLZWARTH GAS TURBINE CO., OF SAN FRANCISCO, CALIFORNIA, A CORPORATION OF DELAWARE.

GAS TURBINE.

Application filed August 23, 1921, Serial No. 494,641, and in Germany April 30, 1920.

My invention relates to gas turbines and has for its object to provide a simplified and novel construction in which the fastening devices whereby the explosion chambers are secured in position are easily and readily accessible and which includes a novel arrangement for absorbing strains resulting from the expansion of the explosion chambers from the effects of the heat generated therein. My invention will be fully described hereinafter and the features of novelty will be pointed out in the appended claims.

In the accompanying drawing, which illustrates an example of my invention without defining its limits, Fig. 1 represents an axial section of the gas turbine, and Fig. 2 shows the section along the line 2—2 of Fig. 1, some of the valve bodies being omitted.

As shown in the drawing, the gas turbine comprises a nozzle casing 5 in which a plurality of nozzle channels 6 are located at spaced intervals and each communicating at one end with a nozzle 7. The nozzles 7 are mounted on the casing 5 in operative positions with respect to the buckets 8 of a turbine rotor 9, which may be of any suitable and well known construction the axis of the rotor being horizontal in the example illustrated. Valve seats 10 are formed in the nozzle channels 6 and are controlled by valves 11, as shown. The lateral surface of the casing 5 in which the mouths of the channels 6 are situated, and which is shown as facing toward the right in Fig. 1, is parallel to the rotor wheel 9. The turbine further comprises a second casing 12 which is located at a distance from the nozzle casing 5, preferably in parallel relation thereto, and has a surface opposite to, and distant from, the above mentioned surface of the nozzle casing. This second casing 12 is provided with continuous air chamber 13 communicating in any convenient manner with a source of air under pressure and with a fuel chamber 14 connected in a suitable way with a source of gasoline or other fuel. The fuel chamber 14 is located concentrically within the air chamber 13 and spaced therefrom, as shown in the drawing, said air chamber being provided at spaced intervals with outlets 15 for the compressed air, and the fuel chamber being likewise provided at spaced intervals with outlets 16 for the fuel under pressure. Hollow valve bodies 17 are mounted to slide in a direction parallel to the axis of rotation between the air and fuel chambers at spaced intervals, and each valve body 17 is coordinated to one channel 6 and is divided into an air compartment 18, the outlet of which is controlled by a valve 19, and a fuel compartment 20, the outlet of which is controlled by valve 20ª. It will be understood that each of the compartments 18 and 20 thereof communicate respectively with the air chamber 13 it being understood that the air in the chamber 13 and the fuel in the chamber 14 are maintained therein under suitable pressures. Explosion chambers 21 are located between the nozzle casing 5 and the second casing 12 and have one end rigidly secured by suitable fastening devices 22 to the nozzle casing 5 so as to communicate with the nozzle channels thereof, and the other end rigidly fastened by means of suitable fastening devices 23 to the valve bodies 17 so as to communicate with the outlets of the compartments 18 and 20.

The operation of the engine may be carried out in the customary manner, it being understood that the turbine includes suitable igniting devices and controlling means in the usual way which, because of the fact that they form no part of the present invention, have not been illustrated. In practice, the air inlet valve 19 is actuated to admit a charge of compressed air to the explosion chamber 21 to scavenge the same, after which the fuel inlet valve 20ª is actuated to admit a supply of fuel to said explosion chamber in order to combine the same with the air in said chamber to form an explosive mixture therein. This mixture is ignited at the proper time, the resulting explosive force opening the valve 11 and exerting its effect through the channels 6 and nozzle 7 upon the buckets 8 of the rotor 9 and consequently revolving the latter upon its axis. It will be understood that the described operation takes place in sequence in successive explosion chambers 21 so that while the operation in each explosion chamber is intermittent, the effect of successive explosions in successive explosion chambers is substantially constant upon the rotor of the gas turbine. As the explosion chambers expand under the effects of the heat generated therein, the strains and stresses exerted by such expansion will be communicated to the valve bodies 17 and will cause the same to shift axially and adjust themselves accordingly in the second casing 12. In this way the strains resulting from such heat expansion are absorbed and accordingly are not communicated harmfully to either the nozzle casing or the second casing, as the case may be. It will be understood that suitable provision may be made to prevent leakage between the valve bodies 17 and the contiguous portions of the valve casing.

In addition to the advantages resulting from the neutralizing of strains and stresses due to the physical expansion of the explosion chambers, the arrangement provides the additional advantage that the fastening means whereby the opposite ends of said explosion chambers are secured to the nozzle casing and the second casing respectively are readily accessible when, for any purpose, this is desired. Furthermore, with the improved construction it is possible to fixedly attach the nozzle casing and the second casing with the main frame 24, these two elements, that is, the nozzle casing and the second casing, representing the two major or largest elements in a gas turbine having a horizontal shaft. In this way, it is possible to construct the gas turbine having a horizontal shaft in a simple and efficient manner in which all parts remain easily accessible and in which strains resulting from the expansion of material due to generated heat are neutralized and absorbed.

Various changes in the specific form shown and described may be made within the scope of the claims without departing from the spirit of my invention.

I claim:

1. In a gas turbine, a turbine wheel having a horizontal axis, a main frame, a casing fixedly attached thereto and provided with a channel having a lateral mouth, a nozzle supported by said casing and communicating with said channel, a second casing fixedly attached to said frame and provided with an opening spaced from, and located opposite to said mouth, a chamber for the combustion media provided in said second casing in communication with said opening, an explosion chamber extending, and forming a communication between said opening and said mouth, and fastening means for detachably securing the opposite ends of the explosion chamber in position.

2. In a gas turbine having a horizontal axis the combination comprising a turbine wheel, a main frame, a casing fixedly attached thereto and having a surface parallel to said wheel, a nozzle mounted on said casing in operative position and circumferentially disposed with respect to said wheel, said casing being provided with a channel communicating with said nozzle and having a mouth in said surface, a valve mounted in said casing to control said channel, a second casing fixedly attached to said main frame and having a surface opposite to, and distant from, said first named surface, an opening being provided in said second surface and coordinated to said mouth, a chamber for the combustion media in said second casing, communicating with said opening, an explosion chamber extending between and communicating with said opening and said mouth, and fastening means accessible in the space between said two surfaces for securing the opposite ends of the explosion chamber against a displacement parallel to said surfaces.

3. In a gas turbine, a turbine wheel having a horizontal axis, a main frame, a casing fixedly attached thereto and provided with a channel having a lateral mouth, a nozzle supported by said casing and communicating with said channel, a second casing fixedly attached to said frame and divided into an air chamber and a fuel chamber, a valve body slidably mounted in said second casing, said valve body being coordinated to, and located opposite to said mouth, adapted to slide in a direction towards and from the same, and divided into compartments communicating with said chambers, an outlet being provided in each compartment, valves arranged in said valve body to control said outlets, an explosion chamber extending between said valve body and said coordinated mouth and communicating with said mouth and the outlets of the compartments of said valve body, and fastening means for attaching the opposite ends of said explosion chamber to the first named casing and the coordinated valve body respectively.

In testimony whereof I have hereunto set my hand.

HANS HOLZWARTH.